United States Patent [19]

Wiedemer

[11] Patent Number: 5,155,680
[45] Date of Patent: Oct. 13, 1992

[54] BILLING SYSTEM FOR COMPUTING SOFTWARE

[75] Inventor: John D. Wiedemer, Houston, Tex.

[73] Assignee: Signal Security Technologies, Houston, Tex.

[21] Appl. No.: 345,128

[22] Filed: Apr. 27, 1989

Related U.S. Application Data

[63] Continuation-in-part of Ser. No. 292,927, Jan. 3, 1989, Pat. No. 5,047,928, which is a continuation-in-part of Ser. No. 922,689, Oct. 24, 1986, Pat. No. 4,796,181.

[51] Int. Cl.$^5$ .............................................. G06F 15/00
[52] U.S. Cl. .................................. 364/406; 364/918.1
[58] Field of Search ............... 364/200 MS, 900 MS, 364/406, 918.1; 178/22.01, 22.08

[56]         References Cited

U.S. PATENT DOCUMENTS

| | | | |
|---|---|---|---|
| 3,806,882 | 4/1974 | Clarke | 340/172.5 |
| 4,168,396 | 9/1979 | Best | 364/200 X |
| 4,246,638 | 1/1981 | Thomas | 364/200 |
| 4,278,837 | 7/1981 | Best | 364/900 X |
| 4,310,720 | 1/1982 | Check, Jr. | 364/900 X |
| 4,433,207 | 2/1984 | Best | 178/22.09 |
| 4,446,519 | 5/1984 | Thomas | 364/300 |
| 4,447,890 | 5/1984 | Duwel et al. | 364/900 |
| 4,450,535 | 5/1984 | de Pommery et al. | 364/900 |
| 4,458,315 | 7/1984 | Uchenick | 364/200 |
| 4,462,078 | 7/1984 | Ross | 364/300 |
| 4,471,163 | 9/1984 | Donald et al. | 178/22.08 |
| 4,494,114 | 1/1985 | Kaish | 364/900 X |
| 4,504,915 | 3/1985 | Daniels et al. | 364/900 X |
| 4,511,970 | 4/1985 | Okano et al. | 364/401 |
| 4,513,389 | 4/1985 | Devchoudhury | 364/900 |
| 4,562,306 | 12/1985 | Chou et al. | 178/22.08 |
| 4,609,777 | 9/1986 | Cargile | 178/22.08 |
| 4,658,093 | 4/1987 | Hellman | 380/25 |
| 4,683,553 | 7/1987 | Mollier | 380/4 |
| 4,796,181 | 1/1989 | Wiedemer | 364/406 |

FOREIGN PATENT DOCUMENTS

WO85/03584  8/1985  World Int. Prop. O. .

OTHER PUBLICATIONS

Freedman, "Foiling Corporate Software Pirates," *High Technology*, Jul. 1985, pp. 62-64.

*Primary Examiner*—Dale M. Shaw
*Assistant Examiner*—Laura Brutman
*Attorney, Agent, or Firm*—Quarles & Brady

[57]           ABSTRACT

A computer software security and billing system is disclosed in which the application program is enciphered in accordance with an algorithm driven by a numeric key. The user's computer is provided with a hardware security module and a removable billing module, both of which carry unique codes. A security program accesses the application program and also writes information about billing into the billing module. The billing module is periodically replaced so the user can be charged based on amount of usage of the software. The security system is also capable of operating to provide data and program security independent of the billing function.

21 Claims, 4 Drawing Sheets

BILLING SYSTEM FOR COMPUTING SOFTWARE

This is a continuation-in-part of patent application Ser. No. 292,927 filed Jan. 3, 1989, now U.S. Pat. No. 4,047,928 which is a continuation-in-part of patent application Ser. No. 922,689 filed Oct. 24, 1986 now U.S. Pat. No. 4,796,181.

FIELD OF THE INVENTION

The present invention relates to the field of the marketing of computer software in general, and relates, in particular, to a system for securing and/or encoding personal computer software so that it can be marketed to the ultimate user on a pay-per-usage arrangement rather than on a fixed fee purchase price.

BACKGROUND OF THE INVENTION

The personal computer industry has grown enormously in the past decade and has created a large market in software suitable for operation of personal computers. Many companies are in the business of creating and publishing computer software packages which are then marketed to personal computer owners for use in their machines. Typically such computer software packages are marketed on a fixed fee basis in which a user purchases a copy of the software, usually under terms of a written license, for a fixed price thereby granting to the user perpetual use of the software. It has been a characteristic of this industry that in order for the publishers of the software to recover the often quite large investment in research and development of the software, and also the costs of manufacture and marketing, that the purchase price of many such software items has been relatively high, particularly for limited distribution or special-purpose software. This high purchase price has been a barrier, in some circumstances, to the widespread sale of some software and has limited the penetration of software publishers in some markets. In addition, some users are reluctant to incur such a purchase price without first operating the software, since the suitability of software is very difficult to judge without actually using it.

The relatively high purchase price of software has lead to another phenomenon perceived as a problem by many software publishers. It is often relatively easy for a personal computer owner to make duplicate copies of any software which the owner has purchased unless the software is in some fashion protected from such copying. It has become quite common for some personal computer owners to make and disseminate such copies to their friends and acquaintances. This often widespread unauthorized copying dilutes the market for the software product and may cause the publisher to ask even a higher price for each legitimate copy of the product in order to ensure a reasonable amount of return.

One solution to this dilemma has been for manufacturers to institute copy protection schemes which are intended to allow media carrying personal computer software to be sold with the media containing technical devices intended to ensure that unauthorized copies cannot be made on personal computers. Copy protection schemes were put into place by a variety of companies using various techniques. One technique was to use a non-standard format for the magnetic disk on which the program was stored, with the non-standard format not being copyable given the operating system for the personal computer for which the program was intended. A second technique which was used was to introduce limited format error or an altered physical characteristic into the disk which the computer is unable to duplicate when copying the disk. Special commands in the program would then check for that identifying information before allowing operation of any programs on the disk and thus to ensure that the disk was not a copy. It has been a more recent trend that a third category of software protection schemes have been proposed which involve physical protection either by making physical variances in the disk which must be checked by the program before it can operate or by requiring hardware devices, known as "locks," which must be purchased along with the software in order to operate it. All such copy protection schemes have suffered from some disadvantages in that the technique of protection of many of the schemes have been deduced by individual computer owners who then widely publish how the copying protection scheme may be avoided. Certain programs are also sold commercially which enable the copying of certain disks which are otherwise intended to be copy protected. Hardware based systems can also be avoided by the custom creation of hardware devices which can emulate the lock intended to be sold with the system.

It is also generally known in the prior art that computer programs can be encrypted or encoded so that they must be used with a special microprocessor or other unique hardware having the capacity to decrypt or decode the program. Such systems are limited to the particular encryption/decryption system hard-wired into the computer and thus are vulnerable to unauthorized use once the methodology of the system is deduced once by a user.

SUMMARY OF THE INVENTION

The present invention is summarized in that a billing system for the distribution of personal computer software includes a security module which may be installed in the personal computer of the user; a billing module which may be installed and removed from the expansion module contained in the computer and which contains therein suitable memory location for the writing and reading of billing information; and at least two programs on a memory media deliverable to the user, one program being a security program and the other program being an enciphered application program, the security program serving to interrogate the security module and the billing module to determine the codes therefrom, using that information to generate a decipher algorithm and using that decipher algorithm to decipher the application program which may then be operated by the personal computer.

It is an object of the present invention to provide a security and billing system for personal computers which allows users to make an unlimited number of copies of the program without endangering the overall program security or the appropriate return of income to the software publisher.

It is yet another object of the present invention to provide a software dissemination and billing system which allows for users to obtain access to personal computer software on a pay-per-usage basis so that software can be evaluated, tested, and used without a large initial investment in the software package while still ensuring a return of income to the software creators for actual use of the software.

It is yet another object of the present invention to provide a security system for software distributed in such a billing system such that the billing system is extremely difficult to evade.

Other objects, features, and advantages of the present invention will become apparent from the following specification when taken in conjunction with the accompanying drawings.

BRIEF DESCRIPTION OF THE DRAWING FIGURES

DESCRIPTION OF THE PREFERRED EMBODIMENTS

The invention disclosed herein can be conceptualized as having a minimum basic system for software security and billing and a series of additional options or features which may be added thereto. The additional options and features on this system may either increase the desirability of the system from a commercial viewpoint or enhance the security of the system, and may be added individually or in groups to the basic system. Some of the options and enhancements are likely to be used in an actual commercial embodiment of this invention. However, in order to understand the concept of the present invention most fully, it is first necessary to understand what the basic core concept contained herein is. Accordingly, it is first necessary to examine the simplest possible system constructed in accordance with the present invention.

Figure 1:
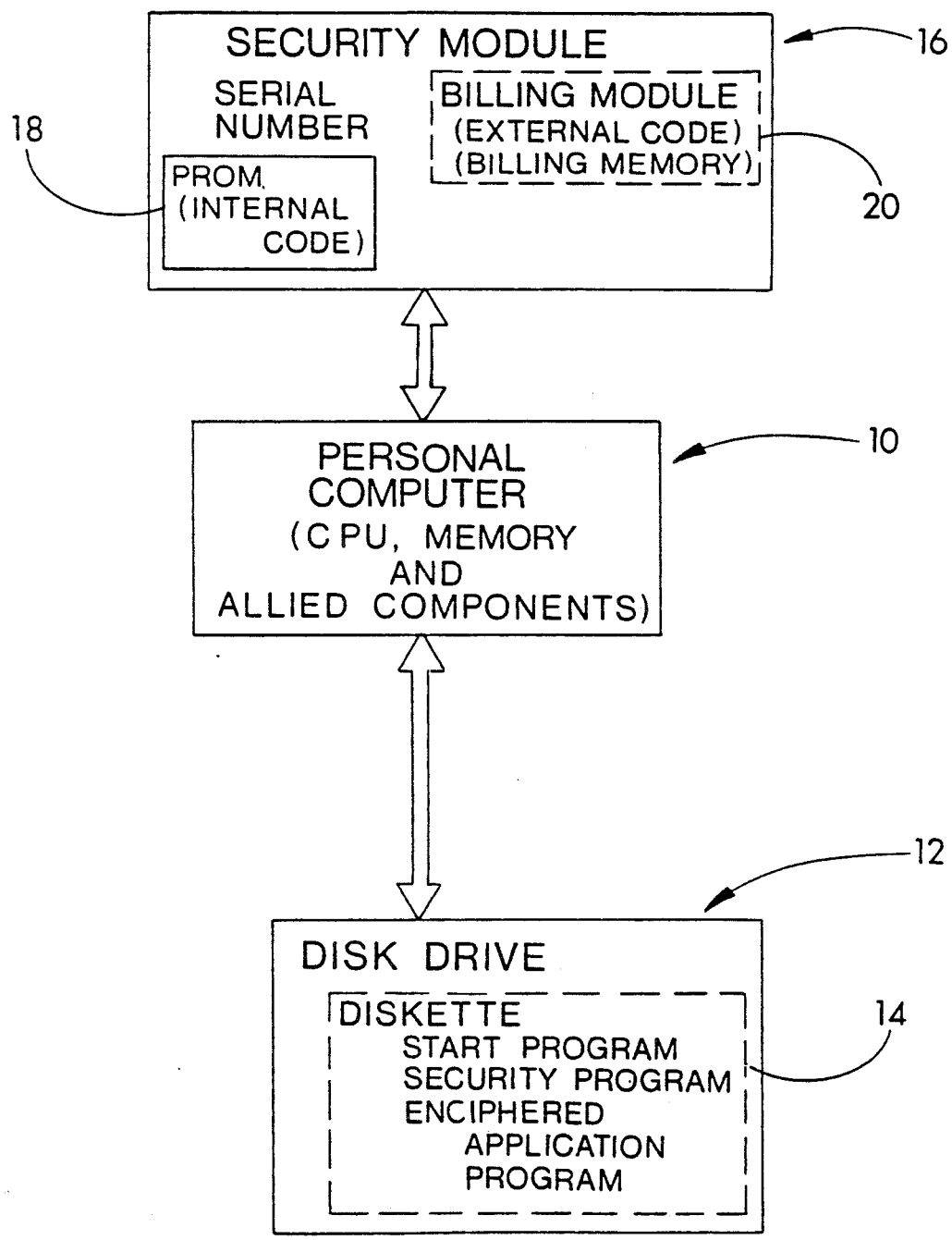
FIG. 1 is a schematic illustration of a personal computer including a security module constructed in accordance with the present invention.

A basic computer software security and billing system according to the present invention is illustrated by the block diagram of FIG. 1 as used in a personal computer. A personal computer, having a central processing unit (CPU), resident memory, input/output interfaces, and other related circuitry, is generally indicated at 10 and is otherwise conventional and well-known in the art. The computer CPU and memory unit would normally include one or more media on which computer software programs can be stored, typically a disk drive, such as that generally indicated at 12 in FIG. 1. While the present invention is particularly described with regard to a conventional magnetic disk media currently as is used in personal computers, it is to be understood that it is equally applicable to other permanent memory media such as magnetic cartridge, optical disk, rom chip. etc. In the embodiment of FIG. 1, the conventional disk drive 12 may be loaded with an appropriately formatted magnetic diskette 14 containing thereon programs to be utilized by the user. The diskette 14 is a conventional diskette in its physical make-up, although the programs carried on it will be somewhat unique as will be discussed below. The unique hardware required by the present system is a security module generally indicated at 16. The security module 16 is a hard-wired logic circuit electronically attached to the personal computer 10. The security module 16 may be constructed as an expansion card which can be inserted into the chassis of a personal computer having a so-called "open" architecture. The security module may also be a stand-alone accessory to the main computer which is attached to the computer by an appropriate serial or parallel port. The method of communication, i.e., whether it is parallel or serial, between the main computer and the security module 16 is unimportant as long as there are address and bi-directional data paths for information to be transferred between the security module 16 and the personal computer 10.

Within the security module 16 is located at least one fixed memory device 18, preferably a PROM or programmable read-only memory. Other fixed memory devices than a PROM may also be used within the scope of the present invention as long as the device used is capable of holding fixed numerical information of the type required here. The PROM 18 in the security module carries thereon a fixed pre-selected numerical code, referred to here as an internal code. The internal code is unique to each individual security module 16. The security module 16 also may carry elsewhere there on it a serial number also unique to the security module 16. The serial number on the security module 16, which is usually not the same in numerical value as the internal code carried in the PROM, is preferably fixed in both electrical form (such as in a PROM or switch settings) and in human readable form so that security modules 16 can be matched with appropriate internal codes.

Also carried on the security module 16, when it is in use, is a billing module 20. The billing module 20 is a removable memory device which can be inserted into a previously provided access interface on the security module 16. In other words, the billing module 20 is a removable memory module which can be easily removed from and inserted into the security module 16. The billing module 16 must have a memory portion which can be read by the computer 10 through the security module and written thereon. Accordingly, the exact media of the billing module can be varied within the scope of the present invention. Many media can be used for the billing module 20 based on magnetic, electronic, optical or even physical data storage technologies. A suitable medium might include a paper card having a magnetic memory portion thereon which can be inserted in a read/write interface provided on the security module 16. For example, the security module 16 could be a stand-alone accessory to a personal computer and could have a simple card slot into which a paper card carrying a magnetic strip thereon is inserted with the magnetic strip serving as the billing module 20. It is the preferred embodiment of the billing module in the present invention, however, that the billing module 20 consist of an EEPROM. An EEPROM is an electrically alterable and erasable programmable read-only 20 memory. Preferably the EEPROM billing module 20 is encapsulized in such a fashion that it is easy to handle by a user and is designed to interface with a simple mechanical and electrical interface provided on the security module 16 into which the billing module 20 can be inserted.

While the billing module may often be removable, it is also envisioned that in some variations, the billing module might not be removable. In one such variation, the billing module could be connected through a modem to be updated and read for billing purposes by telephone Another possibility is that the billing module could be connected to appropriate circuitry to be updated by fixed wire or by radio signal. It is also possible for the billing module to be located some distance from the computer, for example at a different station in a local area network where it could be polled and updated as needed and could be used by a number of personal computers.

The billing module 20, of whatever media it is constructed, has at least two portions of memory thereon. The first memory portion carries a numerical value referred to here as an external code. The second portion of the billing module memory consists of billing memory. The external code is a number designed by the computer to be read from the billing module 20. There may be more than one external code and the external code may consist of more than one portion or part. The billing memory is intended to store billing information which may be data previously loaded onto the billing module 20 or may be a blank area on the billing module 20 onto which information may be written. In either event, it is critical to the present invention that the billing memory portion of the billing module 20 be alterable by the computer 10 in accordance with information received and processed by it. It is therefore also possible that the billing module itself could be embodied in a removable magnetic storage media, such as a floppy diskette, which could have an area onto which the external code was pre-recorded and a separate portion into which billing information is loaded.

The application diskette 14 for use within the present invention carries thereon at least one computer program which the user desires to operate. This is referred to herein as the "application" program. In accordance with the present invention, the application program is enciphered in accordance with an algorithm driven by a numerical key, as will be discussed in more detail. The diskette 14 therefore carries the application program in its enciphered form. The diskette 14 also carries unenciphered start program. In addition, the diskette 14 also carries a security program which may or may not be enciphered depending on the level of redundant security desired in the embodiment of the present invention. If the security program is not enciphered, then the start program may merely be a portion of the security program.

In its operation, the basic system illustrated in FIG. 1 is intended to operate as follows. The computer 10 is operated in a normal fashion and the diskette 14 carrying the enciphered application program which the user desires to operate is loaded into the computer disk drive 12. As is conventional, the computer CPU loads the program from a previously designated portion of the diskette 14. Carried on that previously designated portion of the diskette 14 is the unenciphered start program which is thus loaded into the resident memory in the computer 10. The start program then operates. In its most basic embodiment, the first thing that the start program does is verify the presence of the security module carrying an active billing module in it. The start program also verifies from the billing module that the user still has billing credit to operate the program before it will proceed. Assuming that the billing module is present, and billing credit is available to the user, the security program is run. The security program reads the external code from the billing module 20. This code serves as a "key" to a previously selected algorithm utilized by the security program. No single particular algorithm is to be used for the enciphering and deciphering of all application programs. In fact, it is intended that different algorithms be used on different diskettes 14, as long as the security program on any diskette corresponds to the algorithm used to encipher the application program on the diskette. Each algorithm so used is preferably based on a numeric key so that the same key must be available to decipher the program as was used to encipher it, although it would also be possible to use a two key system in which the encoding key is different from the decoding key. Thus, the algorithm used by the security program is the inverse of the algorithm used to encipher the application program. The security program uses the key from the external code to operate a deciphering algorithm to decipher the enciphered application program. The security program may decipher the entire application program, or may only decipher one or more modules of the application program which are to be used by the user at one time, or may decipher only a small number of very important program instructions, addresses or locations. The security program may also shift a small number of mislocated instructions. The security program then turns over execution to the application program which thereby proceeds to execute for the user.

As the application program executes, the security program periodically monitors application program execution. This can be done by formatting the application program as a routine called by the security program with program execution periodically returned to the security program or alternatively may be accomplished through one or more interrupts by which the security program interrupts operation of the application program. In any event, during this periodic process, the security program verifies continued use of the application program within the computer, and assuming that use is continuing, the security program then creates billing data based on program usage. The billing data is stored on the diskette 14 at very frequent intervals and is then periodically written into the billing information area of the billing module 20. There are generally two approaches for entering billing information in the billing module 20. In one approach, the billing memory of the billing module 20 is provided with a pre-established authorization of a certain amount which is loaded into the billing memory of the billing module 20 before it is supplied to the user. In this variation, the security program would then decrease, or decrement, the value of the billing credit authorization contained in the billing memory as use of the application program continued. In the second approach in which credit is extended to the user, the security program would note when the application program execution continues, and write information onto the billing memory indicating usage by the user. This approach would be to increment the billing memory by adding additional information thereto. Regardless of whether a decremental or incremental system is used conveying billing information to the billing memory, the billing can be done on a time basis or can alternatively be done by monitoring any type of operation by the application program, such as disk access or reloading of different modules, which is generally indicative of the amount of use of the application program which is being enjoyed by the user.

This system, in its simplest variation as described, conditions the users access to the application program on the presence of a properly matched billing module 20 which must also have billing authorization on it. The billing module 20 must be matched to the diskette 14 in the sense that the application program on the diskette is encoded by an algorithm the key to which is derived from the external code on the billing module 20. The numeric decipher key is thus unique to the user, although the encipher/decipher algorithm may vary from diskette to diskette, This system is the easiest to implement and maintain. Users could return the billing module 20, usually by mail to the dealer or billing center for additional usage authorization when the limit set int eh billing module is 20 reached. Alternatively, the billing modules 20 could be read and reloaded via modern hook-up. Thus, users could be charged only for the usage they make of the software. In addition, since the codes can be changed periodically, permanent breach of the security of the system is unlikely.

The first level of additional sophistication and security to be added to this basic system is to make use of the internal code in the PROM 18 in the security module. The decipher key used in the algorithm by the security program would then not be simply derived from the external code but would be derived from both the internal and external codes. This derivation of the decipher key could be relatively simple, such as simple addition of the internal and external codes, or could also be a more complex relationship. Thus, the security program would first derive the decipher key, by whatever method was selected, and then use that key in the algorithm to decipher the application program.

The effect of this enhancement to the system is to create additional security. The user cannot evade the security of the system simply by learning the external code. By requiring the internal and external codes to be combined, the chances of a user gaining access to both codes is reduced and the system is very difficult to crack. Furthermore, transfer of the billing module to an unauthorized computer is prevented.

These simplest and most basic variations in this system provides significant security to the software creator and distributor. The external code and internal code are unique to any individual user and thus the enciphered application program on the diskette 14 may only be successfully used by the single user who has validly obtained a security module 16 and an appropriate billing module 20 for use with that specific individual security module 20. Thus, for use with a diskette 14 it is not required that any form of copy protection be employed, since the user can make simply as many copies as he may desire. Each of these copies will be useless to the user, however, unless it is used in conjunction with the security module 16 containing an appropriate billing module 20 therein. Extra copies of the enciphered application program will not allow the user to run the program and there is therefore no benefit to him. The security of the system is inherently difficult to break because of the fact that the internal code in the PROM 18 in the security module and in the external code of the billing module 20 are previously selected and unique to each individual computer. Therefore, if one user of software distributed in this fashion should uncover the algorithm used by a particular security program, and the internal and external codes used with a particular security module 16 and billing module 20 for a program that he has in his possession, that information will not be sufficient for another user to evade system security since the code will be different. In addition, various versions of the security program can be used, each utilizing a different algorithm for the enciphering and deciphering process.

In this way, multiple levels of security are provided without the necessity for copy protection.

An additional method for monitoring any non-compliance with the security features of the system of the presence is to individualize each legitimately sold diskette 14. The diskettes 14 could be provided with individual hidden serial numbers or with individualized non-functional program-like character sequences. If this option is used, and the security is breached, at least the breach can be traced back to the diskette from which non-secure copies were made to facilitate remedial action.

In addition, users can be billed on a charge-per-use basis in any easy fashion. Using a decremental billing system, the user can purchase a billing module 20 from his software supplier containing a pre-authorization of a certain amount of usage. He then takes the billing module 20 home, and takes the program disk 14 enciphered to match his billing module 20 home with him and operates the program as he desires. If the user exceeds the amount of authorization contained in the billing module, program execution stops. If the user decides he requires no further use of the program, he returns it to his vendor and is given credit for the remaining authorization contained in the billing module which he returns to his dealer. Alternatively, for customers who are creditworthy, the billing modules can be issued to them on a credit basis. Again, a specific billing module 20 has to match a diskette containing an application program enciphered by an algorithm whose decipher key matches the external code in the billing module 20. The user can take the program home, operate it as desired, and return the billing module periodically to the supplier for reading. The supplier can then bill the user for his use. Under such a system, the billing module would be replaced periodically by the supplier, typically on some kind of fixed time period basis, such as monthly. The transaction could occur by mail, particularly if the billing module consists of an EEPROM, which can easily be mailed to the supplier and back to the user each month, so that the user always has a billing module operable in his system. Another alternative is for the billing module to be read remotely by a billing facility. A modem and suitable software could allow the computer 10 to be remotely accessed by telephone so that the central facility could read billing information on the billing module 20 to charge the user.

As can be seen from the foregoing discussion, the present invention is not dependent on any particular algorithm. In fact, the system is operable with quite a variation in the type of algorithm used for the encrypting as long as the appropriately encrypted algorithm is used with the appropriate de-encrypting security program on the disk and further as long as the encryption and decryption are keyed by the same numeric key. Since the disk is supplied with both the enciphered application program and the security program intended to do the de-enciphering, the information actually physically in the computer, consisting of the codes and billing information in the billing module and on the security module is, in essence, independent of the encryption algorithm used on the program which is used with it.

To better understand the present invention it is helpful to consider an example of a simple method for deciphering an application program. This simple example uses relatively short codes. In practice, a more complex algorithm methodology and longer codes would be used to add to system security.

As is made clear from the discussion above, the enciphering or deciphering procedure of the present invention is driven by a numerical code, referred to as the decipher key. The enciphering key is chosen at random and used in the algorithm to create the enciphered program. Therefore, the first step in the deciphering procedure is to derive or create the appropriate deciphering key corresponding to the enciphering key used for the program in question. To develop the deciphering key, the security program would read the code contained in the billing module 20 of the security module 16, known as the external code. This external code would then be added to the internal code contained in the PROM 18 permanently mounted in the security module 16. These two codes would also be operated on by the disk code which would be resident on the applications diskette 14 which is desired to be operated by the system. Since the enciphering key was chosen at random, and since the internal code contained in the security module 16 is fixed, the external code contained in the billing module 20 and the disk code contained in the diskette 14 must be properly selected so that the operation of the algorithm on all these codes yields the appropriate deciphering key. In the example here, where the algorithm consists of simple addition, the three codes may simply be added through normal binary addition as follows.

|  |  |
|---|---|
| External Code | 1010 |
| Internal Code | 1001 |
| Disk Code | +10110 |
| Deciphering Key | 101001 |

This step yields a numerical value for the deciphering key which then may be used as the key to the deciphering algorithm. Obviously, the length of the codes may vary from application to application and the size of the various three code components may also vary with respect to each other.

Once the deciphering key has been derived using this procedure, the deciphering key may then be used to decipher the program in segments. The deciphering key is used repetitively and applied to the enciphered program code in a method determined by the algorithm. Again, for purposes of this discussion, we will assume that the algorithm of deciphering is simple repetitive logical addition of the deciphering key to the bits of the enciphered program text. That procedure would proceed as follows:

|  |  |
|---|---|
| Enciphered Program Text | 101110 010101 |
| Repeating Deciphering Key | +101001 101001 |
| Deciphered Program Text | [1]010111 111110 |

The numeral in brackets above, [1], is the carry-forward.

The deciphered program text would be loaded into a portion of computer memory to which operation of the program can be transferred in an appropriate step in the security program. The deciphered application program text would constitute the actual instructions to be operated by the computer during the application program. For the above simple deciphering procedure, the enciphering program would be the reverse procedure in which the enciphering key would be subtracted from the unenciphered program text to create the enciphered program text.

In one variation of the procedure of the present invention, it may be desirable to add additional security by enciphering the disk code as well. If this was done, the codes from the internal and external codes would first be added to create a code that would be used as a key in deciphering the disk code itself. Then, the disk code would be added to the internal and external codes to create the deciphering key for the program text itself.

It is also possible that certain important numbers to the operation of the software, such as program addresses or the locations of certain program instructions within the address itself, or as to the relative location of information on certain sectors of the floppy disk, may be individually enciphered. In fact, if such addresses are contained within the text of the actual program itself, it may be possible to encipher them within the plain program text and then encipher the entire program text so that those particular key addresses or location numbers are doubly enciphered. To decipher such doubly enciphered numbers would simply be the reverse procedure in which the entire program text is first deciphered and then individual predetermined key addresses or location numbers would then be de-enciphered.

Within this general scheme, the algorithms both for generating the deciphering key and for deciphering the program text can be varied enormously. While arithmetic or algebraic algorithms are preferred, other algorithms of varying degrees of simplicity or complexity can also be utilized. For example, in creating the deciphering key, rather than adding the various codes together, they could be placed sequentially in binary fashion to create a long numerical value which could be used as the deciphering key. The algorithm for deciphering the program text could involve shifting of data by bit position, or in predetermined unit sizes which may or may not correspond to standard byte length instructions, as long as the methodology and timing of the shifts of data is consistent in such a fashion such that deciphering is appropriately available. In other words, the term "deciphering" as used here is not limited just to encoding of letters, terms or character sequences, but refers to any rearrangement of the application program, or its code, which prevents effective operation of the program in its enciphered form, which is based on an enciphering and deciphering key, and which is reliably decipherable with the key. For example, it is possible to have enciphering routines which would call for the relocation or rotation of various code or instruction sequences around the program. It is also possible that program segments could be distributed around the diskette 14 in such a fashion that the segments have to be re-ordered to function, and the method of this reordering can be determined by such an algorithm. Again, all these variations would have to be done in a methodology that is consistent so that the deciphering program could unscramble the disrupted sequence of instructions to properly read and execute the appclication's program.

Figure 2:
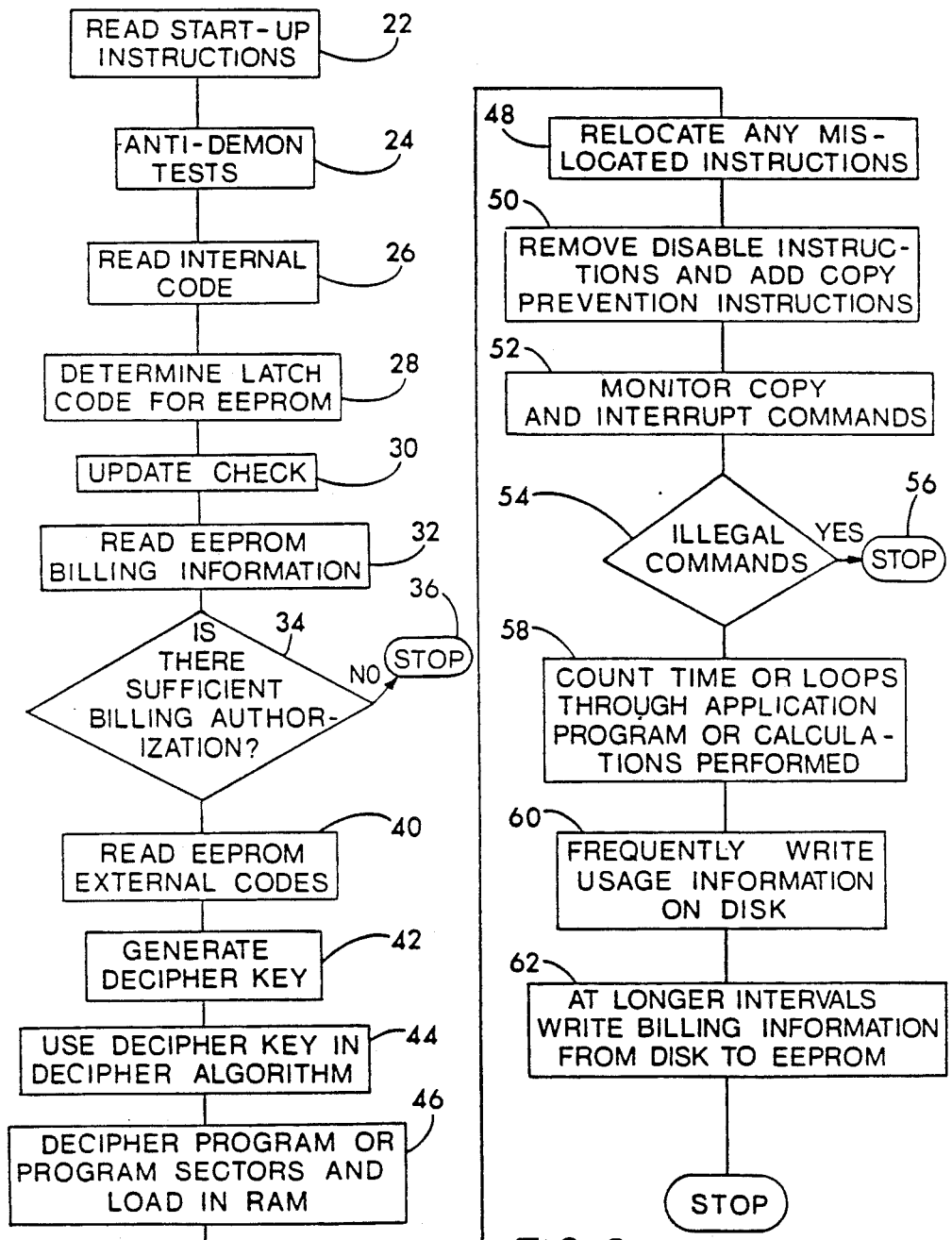
FIG. 2 is a flow chart illustration of the method of operation of the security system in accordance with the present invention.

Shown in FIG. 2 is a flow chart generally illustrating the procedural steps which would have to be followed by the start program and the security program to properly operate an application program in accordance with the present invention. The start program and the security program can be considered as one program if the security program is unenciphered. In some variations of the present invention it may be desirable to encipher the security program which is then deciphered by the start program. For purposes of this illustration, the security program will be unenciphered and the two programs will be referred to together, as they are illustrated as one flow-chart in FIG. 2. The program is first loaded from the disk and that program begins with a step of reading the startup instructions as indicated by reference numeral 22. The program then performs a series anti-demon tests as indicated by program step number 24. A demon is a program or hardware implemented in a personal computer to watch for tests of copy protection identification and then to provide simulated proper identification response, even if the program is an illegal copy. Demons are generally placed in RAM memory although theoretically it is possible to create such demons resident in an internal ROM memory. This program step 24 is simply intended to test for the presence of those devices so as to avoid them or avoid operation in their presence as appropriate. Step number 26 in the operation of the program is to read information from the PROM 18 located on the security module 16. This information would include the internal code carried on the PROM 18 and might also include the hard-wired serial number carried on the security module 16. The information read from the PROM is then utilized to generate a latch code to be presented to the EEPROM which is the billing module 20. It is preferred that the EEPROM billing module 20 have a latch mechanism whereby a proper latch code must be presented to the EEPROM 20 to gain access to it, and this step is to generate that code. Program step number 28 indicates that this calculation occurs and that the latch code is presented to the EEPROM to enable reading and writing on the EEPROM. The first step in reading from the EEPROM occurs at step number 30 where an update check is made as to billing memory locations within the billing module 20 itself. The update check 30, a system option, would have the program examine predetermined locations in billing module 20 memory to see the current update, or release, status of the software. Because the application program, or the security program, may be updated periodically, and because the billing module 20 is periodically replaced, information placed in the billing module 20 about updates in the application program can be read at this point. The update information can be used to inform the user or to prevent further system operation if the supplier wants to ensure all program copies are updated. In other words, the systems program would stop execution of the program if the information on the billing module indicates that this version of the security program is obsolete. At step number 32, the appropriate billing authorization information is read from the EEPROM of the billing module 20 so that the program can evaluate the billing information. At decisional step number 34 the billing authorization information obtained from the billing module 20 is analyzed to determine if the billing module is full or if the credit limit has been exceeded. If either condition is true such that there is no longer sufficient authorization to the user to utilize the application program, then the program proceeds directly to a stop at 36. If the billing module still contains current credit or authorization for the user's use of the application program, then the process can proceed.

The next step 40 commences a procedure which is more logically a part of the security program if it is separate from the start program, although the boundary between the two can be to some degree definitional. The program which has now gained access to the EEPROM billing module 20 reads from the EEPROM the external code or codes to be utilized in the deciphering algorithm. At the next step 42 the program uses the internal and external codes, together with the disk code read from the diskette 14, to generate the decipher key. The decipher key, as referred to earlier, is a numeric value to be used as the key in the enciphering and deciphering algorithm for the application program. The program then proceeds to step 44 wherein the key is implemented in the deciphering locating algorithm. The algorithm is operative both to decipher segments of program code so as to create plain unenciphered computer program text out of enciphered text, and may also be used as a locating mechanism to unscramble various program segments placed in a scrambled fashion in various locations on the diskette 14. The program then proceeds in step 44 to decipher the various sectors and assemble in RAM the resulting deciphered program text in its proper order for proper execution of the application program.

It is also possible that within the actual deciphered application program there may have been deliberately mislocated instructions as part of the enciphering and security process in creating the enciphered application program. If this option is used within the structured of the present system, the location and relocation of those mislocated instructions is determined by the internal and external codes which are again utilized to generate a key which determines the placement of the misplaced program instructions. If this option is utilized within the present invention, a program step 48 is then necessary at this point to relocate any such mislocated instructions and to relocate them in proper fashion in resident memory so that the application program can properly execute. Also, as an additional optional security feature within the present invention, the program would remove disable instructions and add copy prevent instructions to the operating system or other resident instructions contained in the personal computer to prevent disruption of the operation of the application program in any manner which is not intended. A related procedure may be implemented at 52 in which copy or interrupt commands are evaluated to determine if they are appropriate or not. If step 52 is implemented, then each copy or interrupt command is evaluated to determine whether or not it is appropriate, as a logical step 54, and if it is determined that a command is inappropriate, then the program stops executing at 56.

If the user does operate the system correctly, the application program would then execute. While the application program is executing, it is still necessary for the security program to maintain overall control of the program execution and to monitor its execution. This security program would, as indicated by step 58, measure usage of the application program. This measurement could be done by simple counting time of operation of the application program or alternatively could be done through measurement of certain loops through program operation or measurement of the number of calculations performed, depending on the billing strategy of the application program publisher and on the purpose of application program itself. At periodic intervals, when it is determined that an appropriate billing milestone has been passed, the security program would then proceed to step 60 at which it would write application program usage information o the diskette 14 on which the application program is carried. This writing of billing information onto the diskette, or hard disk if a hard disk is utilized, should be done relatively frequently, perhaps every thirty seconds or once a minute. At the same time, it is preferable that the previous written number could be read and compared to records resident in memory to ensure that there has been no alteration of the billing sequence such as might occur if the computer was turned off or if an attempt was made to alter the billing information on the system. At a longer periodic basis, perhaps at intervals of fifteen minutes to a half hour of elapsed time, the security program would then have to write billing information onto the billing module 20 itself at step 62. This information could be done in two ways. If the billing module receives additive information, then the program would write affirmative data onto the billing module in the billing memory portion thereof. If the billing module is provided with a pre-set amount of authorization, then at step 62 a subtraction from that authorization would be made leaving a new balance which represents the remaining credit allowable to the user. The program would then test for billing authority to determine that there is still sufficient billing authority in the billing module for the user to proceed. If not, the program would immediately stop. If the billing authority does exist, then execution of the program could proceed until terminated by the user.

It may be desirable to enhance the security of the transfer of data relating to usage. If this is desired, when the usage data is in copter RAM memory, a check sum is generated from the usage data and both the usage data and the check sum are encoded. The encoded numbers are then written to disk. Data transfer between the disk and the billing module can be similarly protected by encoding.

It may also be desirable to have additional anti-demon tests or other tests for security evasion located at various parts of the security program to ensure that deception of the overall security operation of the system is not impaired.

Another option within the present system is to insert validation numbers, which would be sequential or encoded numerical values, which could be written by the system from the billing module or onto the diskette 14. The system would then always check to make sure that a proper validation umber is resident in the billing module at various times in the programs to ensure that no unauthorized interruption of the system has occurred or improper usage thereof. For example, each billing module might contain a validation number which can be derived from the next-precedent validation number. In this way, if the system tests for either the same or next validation number, use of an unauthorized billing module is prevented, although this level of security may be seen as redundant. Alternatively, the validation number could be generated from a measure of program usage to ensure that the billing module is changed periodically. The most preferred method for the validation number to function is that the validation number, in enciphered form, would be transferred from the billing module to the disk containing the application program. When the billing module is changed, a validation key is read from the new billing module and used to decipher the enciphered validation number from the previous billing module. The deciphered validation number is compared to the expected value before application program execution can proceed. Other similar variations and modifications are possible within the scope of the present invention to add further redundant security to the system.

Figure 3:
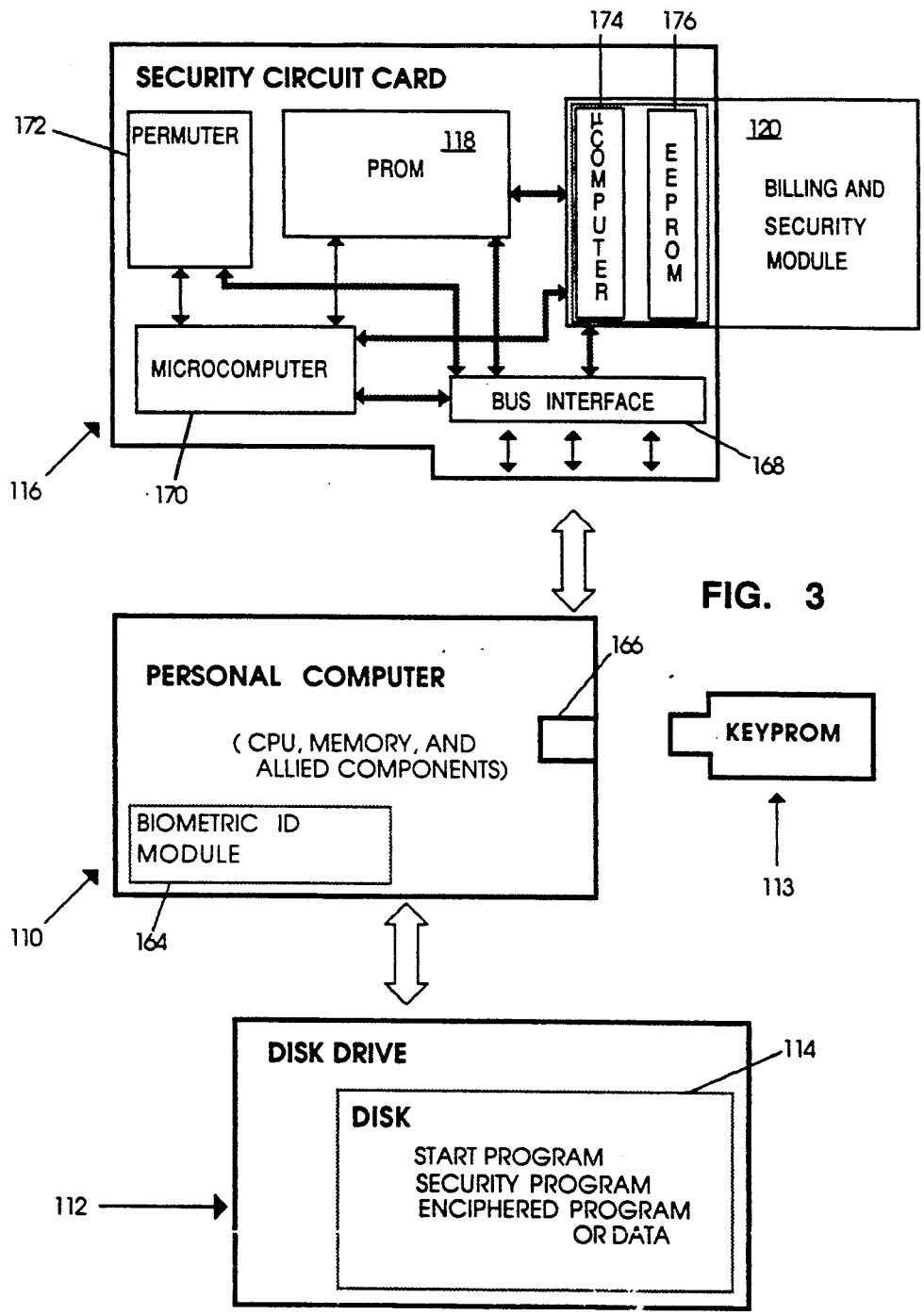
FIG. 3 is a schematic block diagram of another embodiment of the security system connected to a computer and constructed in accordance with the present invention.

Shown in FIG. 3 is an alternative embodiment of the present invention including a more sophisticated billing and security module which can be used for pay-per-use billing of software as described above and also has independent utility for providing secure data access and telecommunications capability for a personal computer even when pay-per-use billing is not desired. In the computer of FIG. 3, numbers which have similar components to those illustrated in FIG. 1 are illustrated with the same reference numeral with 100 added thereto. Thus, there is a personal computer 110 which includes the usual components associated with such computers including a central microprocessor, memory, and other interface components. The personal computer has associated with it a disk drive 112 which includes therein a disk 114 which is a magnetic storage media for storing data and programs. It is preferred that the disk 114 be a hard disk although floppy diskettes are usable within the present invention.

The personal computer 110 of FIG. 3 has been modified slightly from the personal computer 10 of FIG. 1. Added to the personal computer 110 of FIG. 3 is a biometric ID module 164 which is preferably a plug-in compatible board inserted into the personal computer. Such biometric ID modules are capable of identification of individual users by some characteristic of the user in a manner well known to the art at present. Typical biometric ID modules include voice recognition systems and signature recognition systems. Such modules typically include a transducer, such as the sound receiver in the case of a voice analyzer, so that the biometric data from the user can be properly analyzed. The concept behind such biometric ID modules is that the characteristics of the user seeking access to the system, i.e. a voice recognition print, is compared to a known pattern previously stored for authorized users of the system. Access is permitted only if the user's voice pattern matches that which had been previously recorded. Another similar type of biometric ID module also usable in a simplistic form of security in the present invention would be the use of personal identification numbers, or PIN codes which would be easier to find codes known only to the particular users who desire to gain access to the system. In the computer of 110, it is possible that the biometric ID module could be used to control access to the computer at all, but instead it is preferred that the user gain access to the computer whether or not he is recognized by the biometric ID module but that module creates a flag or signal indicating when a match of an authorized user has been achieved.

The personal computer 110 also includes a connector 166 intended to receive a KEYPROM 113. The KEYPROM 113 is a hardware key module contained in a package having a particularized configuration intended to connect to the connector 166 installed in the personal computer 110. The KEYPROM 113 is a hardware key to the operation of the security function of the computer 110, and several types of such hardware keys are well known to the art at present. Suitable KEYPROMs can be constructed of PROM's or fusible links or programmed logic arrays (PLA's) or other similar device embedded in a tamper-resistant package including a physical configuration intended to interfit with a connector such as 166. Each individual user desiring access to the system is provided with a particular individual KEYPROM 113 which contains a particular coded set of information therein associated with that particular user.

The security module or security circuit card 116 of the present invention preferably consists of an expansion card or other independent card which can be inserted into the bus of the personal computer 110, although the security circuit 116 need not be a separate card if desired. Included on the advanced security card 116 is a bus interface 168 intended to provide access to and from the data, address, and control busses associated with the personal computer 110. A microcomputer 170 is provided on the security card 116 which may also communicate to those busses through the bus interface 168. A PROM 118 is provided on the security card 116 which is capable not only of storing the external code therein but also capable of storing sufficient programming for the operation of the microcomputer 170 which would use its own internal random access memory to operate the code which is supplied to it by the PROM 118. The PROM 118 may also optionally be provided with its own internal microcomputer (not shown) to control access to its internal code memory. An advanced billing and security module 120 is provided which is removably detachable from the security board 116. The billing and security module 120 includes therein an EEPROM 176, the access to which is controlled by a second microcomputer 174 actually carried on the billing and security module 120. The microcomputer 174 and the EEPROM 176 can physically be constructed in one integrated circuit or alternatively could consist of two separate integrated circuits which are closely linked and connected therebetween.

In its simplest operation, the advanced billing and security module 120 is intended to provide an additional layer of security for access to information in the form of data or programs for the computer or for telecommunications provided to or from the computer by controlling access to the EEPROM 176 or the PROM 118, which contain the codes necessary to decipher the programs or data. The microcomputers 170 and 174 can control access respectively to the PROM 118 or EEPROM 176 respectively by inhibiting the read and/or write functions thereof by electrical connection or, alternatively, the codes stored on the PROM 118 and EEPROM 176 can be themselves enciphered by a routine which can only be deciphered by the appropriate programming provided to the microcomputers and 174. A particularly advantageous system for implementing multiple security levels is to have enciphered external and internal codes on the PROM 118 and EEPROM 176 which are enciphered through the use of codes which are created by the output of either the KEYPROM 113 or the biometric ID module 164. Thus, only an authorized user possessing the hardware key of the KEYPROM 113 or the proper biometric identity for the ID module 164 is capable of initiating the description of the codes necessary to actually implement deciphering of the program or data to which access is sought.

The provision for a permuter circuit 172 in the security circuit 116 provides additional level of possible security for data or programs. The permuter 172 includes therein a hard wired permutation circuit in a fashion well known in the art, in parallel with a series of exclusive-or adding registers. By appropriate permutations and exclusive-or operations, it is possible to retrievably encipher and decipher data contained in binary form extremely rapidly. Under the control of the microcomputer 170, data and programs can be transferred to the permuter 172, and passed through the appropriate enciphering or deciphering routines, perhaps several times, and then returned either to the memory of the personal computer 110 or to the disk 114 for operation by the user.

The operation of an advance security module, which may optionally include a billing feature, will now be described with the understanding that certain components and redundant levels of security can be omitted in applications in which less security is necessary. First, it must be understood that prior to the operation of the computer 110, certain codes must have properly been set up. The fixed PROM 118 must be loaded with the appropriate internal code and the EEPROM 176 is loaded with the internal code, whether or not is also used as a billing module. The KEYPROM unit 113 must be set with the appropriate parameter and the biometric ID module 164 must be properly set up by appropriate recognition system to recognize the authorized user. It is also possible to load disk codes onto the floppy diskette or hard disk in which the security program was initially loaded so that the disk codes are carried on the disk 114 contained in the disk drive 112.

In its operation by the user, the personal computer 110 allows the user to power up and then proceeds to load the start and security programs contained in the disk 114 which provide a user interface asking the user for appropriate positive authorization to access the various data and programs contained on the disk 114. The queries to the user would include the appropriate interrogatories to gain information necessary for biometric identification by the biometric ID module 118 and would call for the insertion of the KEYPROM 113 if not previously inserted.

The next step would be for the information in the form of data or programs to be deciphered or enciphered to be loaded into memory in locations as designated by the security program. This data or program material is then organized to prepare it for the enciphering or deciphering operation. This preparation step may consist of little more than loading the material in convenient blocks for the enciphering or deciphering operation.

Normally, the level of security provided would vary in accordance with the likelihood of access by strangers. For example, for telecommunications of data or programs, it would be appropriate to have redundant levels of security to avoid access to the data during the telecommunications activity. By contrast, for local operation of data or programs only minimal levels of security may be necessary and various redundancies in the system can be deleted by appropriate perimeters in the security program as operated by the user.

To begin the process of obtaining and processing the codes to decipher or encipher the data, the security program begins with the retrieval of the various necessary codes. The first codes which are retrieved are the KEYPROM code from the KEYPROM 113, the bioauthorization code as determined by the biometric ID module 164, and the disk codes from the disk 114. Obviously, if any of these three codes are not implemented in a particular application, no attempt would be made to retrieve such a code. Once the appropriate code or codes are retrieved, the codes are passed to the appropriate microcomputer 170 or 174 on the security card 116. The access to either the PROM 118 carrying the internal code or the EEPROM 176 carrying the external code can be controlled independently, or they can be controlled together, or one or both codes can be enciphered and controlled while the other is not, depending on the level of security desired. Once the codes are passed to the appropriate microcomputer contained on the security card 116, that microcomputer then accesses the fixed PROM 118 or the EEPROM 176 to retrieve the enciphered code contained therein. The enciphered code is then deciphered at a first level so that deciphered external and internal codes are derived. This information is then returned to the processing unit of the personal computer 110 for operation by the security program to combine one codes to commence the deciphering operation as previously described above.

Figure 4:
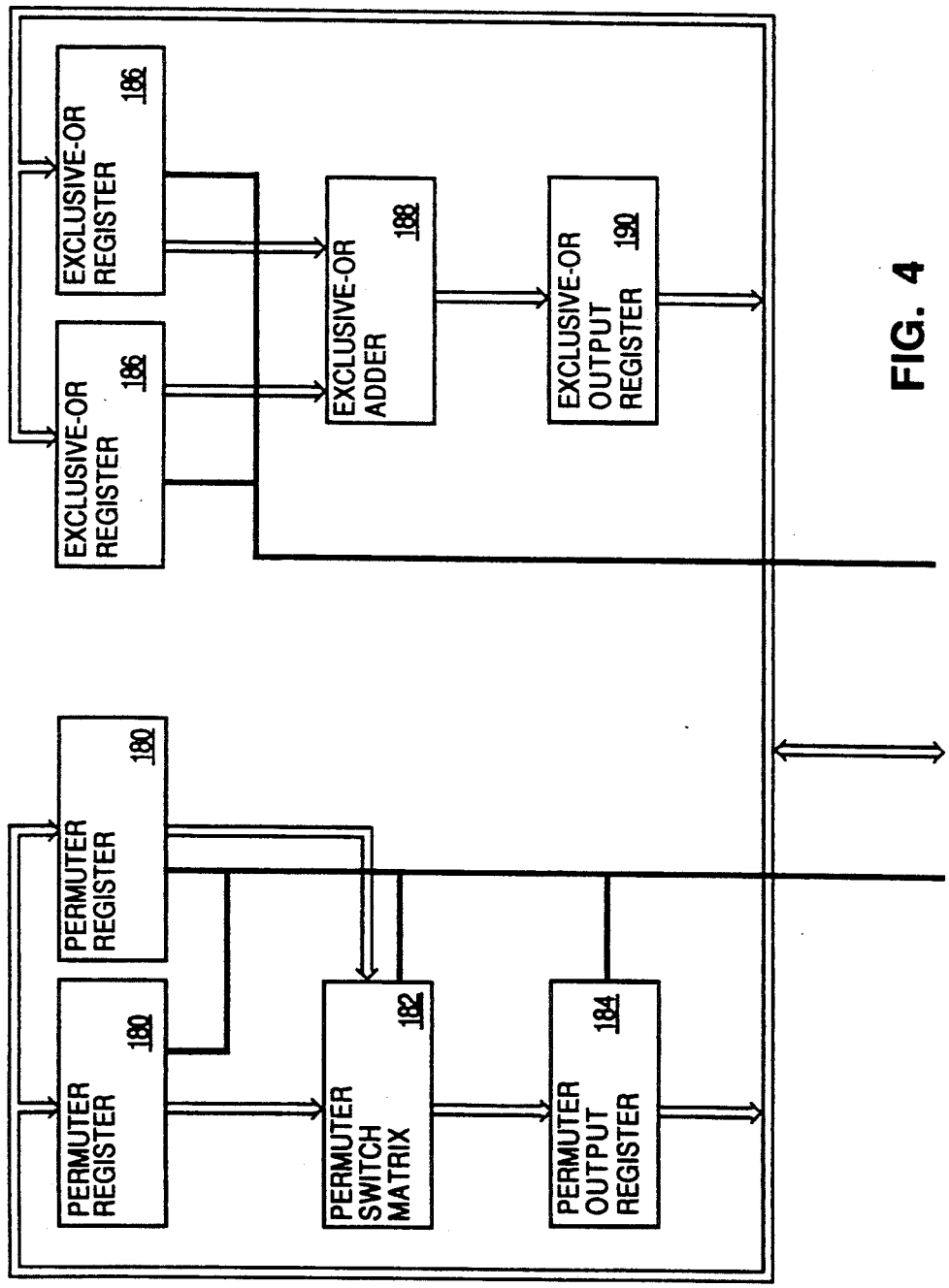
FIG. 4 is a schematic block diagram of the permuter circuit details contained within the circuitry of the embodiment of FIG. 2.

The codes thus derived are used to encipher or decipher information using the particularly advantageous hardware of the security card 116. Information and the codes are passed by the security program from the personal computer 110 to the security card 116 where they are loaded into the permuter 172. Integrally, as schematically illustrated in FIG. 4, the permuter consists of a pair of permuter registers 180 connected by a switch matrix 182 the output of which is connected to a permuter output register 184 and a pair of exclusive-or registers 186 connected by an exclusive-or adder 188 to an exclusive-or output register 190. The various registers are connected to a common bus, preferably address and data lines from the bus interface 168, and control lines from the microcomputer 170 so that data can be loaded or unloaded into the various registers. Thus data blocks can be loaded into one of the permuter registers 180 and the decipher code into the other to create a permuted output at the register 184 depending on the internal connectors in the permuter switch matrix 182. Then the data blocks can be loaded into one exclusive-or register 186 and the code into the other so that they can be combined in an exclusive-or operation, with the output received in the output register 190.

The permuter circuit 172 can thus be used in conjunction with the deciphering codes and the security program to provide a capability of unique deciphering and enciphering of information. Once the codes are derived, blocks of information and code can be passed to the permuter 172 on the security card 116 for treatment selectively by permutation or exclusive-or operation selectively in either order or repetitively and number of times. Since the permuter and the exclusive-or circuitry can be made as wide as is necessary, the circuit can accommodate blocks as large as may be desired.

It is understood that the invention is not confined to the particular construction and arrangement of parts herein illustrated and described, but embraces such modified forms thereof as come within the scope of the following claims.

I claim:

1. A security system for deciphering information in the form of programs or data for a personal computer including a central microprocessor and a bus for communication with other devices and components comprising:

security circuit means connected into the personal computer bus for controlling data access and telecommunications capability of the personal computer;

a security module electrically inserted into the security circuit, the security module including thereon a non-volatile, alterable code memory module containing a computer unique external code;

permuter circuit means located in the security circuit for performing permutation and exclusive-or operation on blocks of data presented to it;

memory means of the personal computer for containing therein information in the form of both data and programs, both enciphered and unenciphered; and a storage medium for the computer carrying security program means for causing the central microprocessor to read the external code from the memory module on the security module an to use that code and their permuter circuit means in the security circuit to decipher enciphered information received from the memory means in a fashion that is dependent on both the permuter circuit means and on the external code so that unenciphered information may be returned to the memory means.

2. A security system as claimed in claim 1 wherein the security circuit further includes a fixed memory means carrying therein a fixed computer unique internal code, both the internal and external codes being necessary to properly decipher the information.

3. A security system as claimed in claim 1 wherein the security module further includes a memory portion into which usage information may be written so that a user can be billed for use of the information.

4. A security system as claimed in claim 1 wherein there is a microcomputer in the security circuit for controlling access to the security module and the permuter circuit.

5. A security system as claimed in claim 1 wherein the security circuit means is in the form of an expansion card which may be added to the expansion bus of the personal computer.

6. A security system as claimed in claim 1 wherein the security module is physically removable from the security circuit.

7. A security system for deciphering information for a personal computer including a central microprocessor and a bus through which other devices may be connected to it comprising:

security circuit means connected to the bus of the personal computer for controlling data access and telecommunications capability of the personal computer;

a fixed unalterable memory circuit in the security circuit containing therein a computer unique internal code;

an alterable memory module electrically inserted into the security circuit means including thereon a computer unique external code;

microcomputer means in the security circuit means for controlling access to the memory module;

memory means of the computer for containing therein information in the form of both data and programs, both enciphered and unenciphered; and a storage medium for the computer carrying at least one code thereon and security program means for causing the central microprocessor to read the code from the storage medium and present that code to the microcomputer means in the security circuit means;

the microcomputer means using the code presented to it from the central microprocessor, the internal code obtained from the fixed memory circuit, and the external code obtained from the memory module to generate a decipher code to be used by the security program means to decipher the enciphered information from the memory means and return the unenciphered information to the memory means.

8. A security system as claimed in claim 7 wherein the memory module also includes a portion into which usage information is written by the security program means so that the user can be billed on a usage bases.

9. A security system as claimed in claim 7 wherein the alterable memory module is physically removable from the security circuit.

10. A security circuit for a personal computer having a processor to control access to enciphered information in the from of a program or data comprising:
   interface circuit means for connecting the security circuit to the bus of the personal computer;
   permuter circuit means for rearranging and logically altering the information in a determinable and reversible method;
   a security module containing an electrically alterable memory portion which carries therein an alterable user unique external code; and
   microcomputer means in the security circuit programmed to recognizes codes transferred to it from the processor of the personal computer and upon recognition of appropriate codes to access the external code so that that external code can be passed to the processor of the personal computer to decipher the information and further programmed to pass the information through the permuter circuit to further decipher that information so that multiple redundant levels of security are provided before a user can access the information which has been enciphered so that the information is only accessible to a user having the security module with the proper external code.

11. A security system as claimed in claim 10 further including a fixed memory portion carrying a computer unique internal code which must be combined with the external code for the processor of the personal computer to decipher the information.

12. A security system as claimed in claim 10 wherein the circuit is contained on an expansion card insertable into the expansion bus of the personal computer.

13. A method of operating a computer data and access security system for transferring data and allowing access to information in the form of data or programs to users who have installed on their computers a hardware security circuit including a microcomputer and into which a security module is removably received, the security circuit including a fixed memory portion thereon which carries an enciphered internal code and the security module including an electrically alterable memory which carries an enciphered external code, the computer of the user also being provided with a security program, the method comprising the steps of:
   (a) commencing operation of the security program by the computer by means of access codes supplied to the computer with the information to be deciphered, the access codes being provided to the microcomputer in the hardware security circuit;
   (b) the microcomputer in the hardware security circuit accessing the internal and the external codes and deciphering these codes with the codes passed to it by the computer and then combining the deciphered external and internal codes to device a decipher code which it passes back to the counter; and
   (c) the computer using the decipher code passed to it by the microcomputer in the hardware security circuit to decipher the information to which access is sought.

14. A security system for a personal computer including a central microprocessor and a bus to which other peripherals may be connected comprising:
   security circuit means connected to the personal computer for controlling data access and telecommunications capability of the personal computer;
   a fixed unalterable memory circuit on the security circuit means containing therein a computer unique internal code;
   a security module electrically inserted into the security circuit means, the security module including thereon (1) a non-volatile, alterable code memory module containing a fixed computer unique external code, and (2) microcomputer means for controlling access to the memory module;
   a hardware key module connectable to the personal computer and carrying a user unique hardware key code therein; and
   a storage medium for the computer carrying security program means for causing the central microprocessor to read the code from the hardware key and present that code to the microcomputer means on the security module;
   the microcomputer means using the code presented to it from the central microprocessor, the internal code obtained from the fixed memory circuit, and the external code obtained from the security module to generate decipher codes to be used by the security program means to decipher data.

15. A security system as claimed in claim 14 wherein the memory module is easily removable so that it may be periodically replaced.

16. A security system as claimed in claim 14 wherein the memory module also includes a portion into which billing information can be written so that users may be billed on a usage basis from information in the memory module.

17. A security system as claimed in claim 14 wherein the security circuit means is on a card which may be inserted into the expansion bus of the personal computer.

18. A security system for a personal computer including a central microprocessor and a bus to which other peripherals may be connected comprising:
   security circuit means connected to the bus of the personal computer for controlling data access and telecommunications capability of the personal computer;
   a fixed unalterable memory circuit on the security circuit means containing therein a computer unique internal code;
   a security module electrically inserted into the security circuit means, the security module including thereon (1) a non-volatile, alterable code memory module containing a fixed computer unique external code, and (2) microcomputer means for controlling access to the memory module;
   a biometric identification module connected to the computer for identifying a particular user of the computer; and
   a storage medium for the computer carrying security program means for causing the central microprocessor to identify the user with the biometric module, and if the identification is correct, then to present a code corresponding to the user to the microcomputer means on the security module;

the microcomputer means using the code presented to it from the central microprocessor, the internal code obtained from the fixed memory circuit, and the external code obtained from the alterable memory of the removable module to generate a decipher code to be used by the security program means to decipher data.

19. A security system as claimed in claim 18 wherein the memory module is easily removable so that it may be periodically replaced.

20. A security system as claimed in claim 18 wherein the memory module also includes a portion into which billing information can be written so that users may be billed on a usage basis from information in the memory module.

21. A security system as claimed in claim 18 wherein the security circuit means is on a card which may be inserted into the expansion bus of the personal computer.

* * * * *